A. L. McGILL.
LATHE STEP GEARING.
APPLICATION FILED NOV. 10, 1911.
1,052,163.
Patented Feb. 4, 1913.
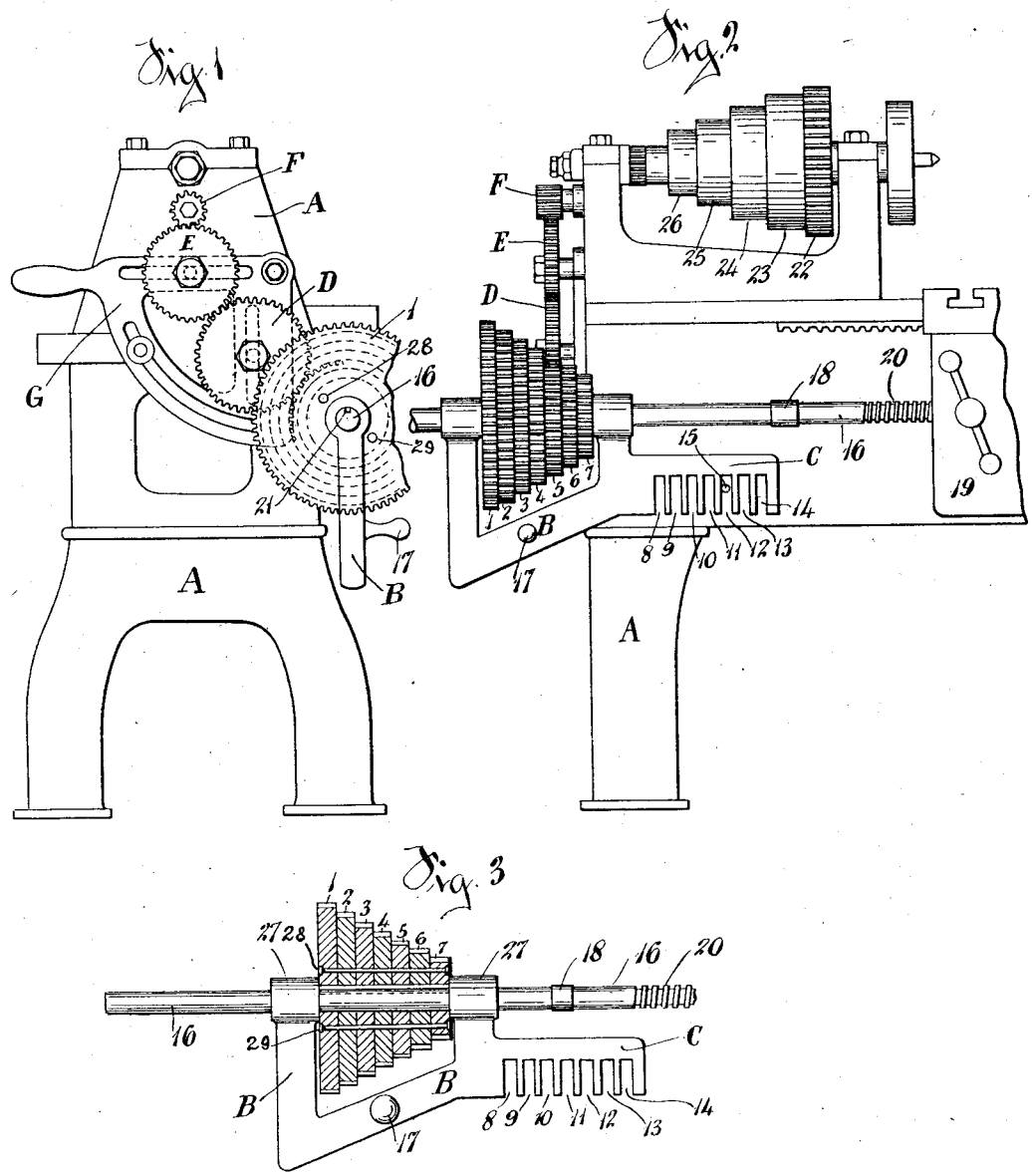

UNITED STATES PATENT OFFICE.

ALBERT LANDEN McGILL, OF DAYTON, KENTUCKY, ASSIGNOR TO HERBERT LORIN SHEPARD, OF CINCINNATI, OHIO.

LATHE STEP-GEARING.

1,052,163. Specification of Letters Patent. Patented Feb. 4, 1913.

Application filed November 10, 1911. Serial No. 659,563.

*To all whom it may concern:*

Be it known that I, ALBERT LANDEN MC-GILL, citizen of the United States, residing at Dayton, in the county of Campbell and State of Kentucky, have invented new and useful Improvements in Lathe Step-Gearing, of which the following is a specification.

My invention relates to lathes and more particularly to that part of the lathe known as the lead screw.

The object of my invention is to provide means by which the speed of the lead screw and table of a lathe can be increased or decreased without the necessity of having to remove one lead screw gear wheel and of having to replace it with another gear wheel suitable to produce the desired increase or decrease of speed.

In other words the object of my invention is to provide a means of lead screw and table adjustment so that any desirable number of screw threads to the inch can be cut without the necessity of having to remove one gear wheel and of having to substitute therefor another gear wheel in order to effect the desired adjustment.

I accomplish this object by means of the mechanism illustrated in the following drawings in which—

Figure 1 is an end elevation of a lathe provided with the usual means of adjustment of the stud and intermediary gear wheel. Fig. 2 is a side elevation of that part of a lathe to which my invention belongs and relates. Fig. 3 is a side elevation of a detached portion of the lead screw of a lathe in connection with my invention.

Like letters and like numerals illustrate similar parts in all figures.

A indicates the frame of a lathe. B, the hinged apron of my invention with the comb C integrally attached thereto. D, the stud gear. E, intermediary gear wheel working in adjustment in connection with the stud gear wheel D. F, the spindle gear wheel. G, the adjustable support for the stud gear wheel D and intermediary gear wheel E. 1, 2, 3, 4, 5, 6 and 7 the several independent gear wheels of my invention. 8, 9, 10, 11, 12, 13 and 14, slots in the adjustable comb of my invention. 15, the comb-slot pin. 16, threaded lead screw. 17, hinged apron handle. 18, hinged apron stop. 19, carriage. 20, threads in lead screw. 21, key way in lead screw.

28 and 29 indicate two rivets connecting and binding together the several wheels 1, 2, 3, 4, 5, 6 and 7 of my step gearing.

Having thus described my invention by illustrations and in detail, I will now describe it as a working mechanism.

The independent gear wheels 1, 2, 3, 4, 5, 6, and 7 are held together by rivets, one on one side and the other on the other side of the lead screw and parallel therewith. The central aperture in each gear wheel is radially slotted and a key common to all the gear wheels, is driven into these slots so that this common key in this way assists in binding these several gear wheels together.

The only change necessary in an ordinary lathe in order to properly receive my invention is the simple elongation of the lead screw and the attachment thereto of the stop 18 and the comb slot pin 15. The key way 21 is cut from the free end of the lead screw to a point near stop 18. The apron B and the gear wheels 1, 2, 3, 4, 5, 6 and 7 are run onto the lead screw 16 from the free end and the parallel arms 27 movably engage the set of gear wheels 1, 2, 3, 4, 5, 6 and 7 on either side and hold them in place on the lead screw 16.

When an adjustment is made the handle 17 is seized with one hand and the apron B is lifted upward, and the comb slots in this elevated position of the apron clearing the pin 15, the apron B and the gear wheels 1, 2, 3, 4, 5, 6 and 7 are easily moved either to the right or left on the lead screw, and the slots 8, 9, 10, 11, 12, 13 and 14 timing with the aforesaid gear wheels. When the proper gear wheel for the adjustment desired comes into the proper position to engage the stud gear wheel D, the apron B is lowered to its normal position and the comb slot pin 15 falls into some one of the aforesaid comb slots and holds the aforesaid apron and gear wheels in the desired position on the lead screw 16. This adjustment being made, the stud gear wheel D and the intermediary gear wheel E, by means of the adjustable support G, are so adjusted as to bring the stud gear wheel D into direct engagement with the desired gear wheel of the set 1, 2, 3, 4, 5, 6 and 7. Thus it is, by means of my invention, any desired number of adjustments as aforesaid can be made without removing a single gear wheel from the lead screw 16, and these several adjustments can be made very quickly.

Having thus described my invention by illustrations, in detail and as a working mechanism, what I claim is:—

In a lathe and in combination; a frame structure, having two parallel, upright, end supports and a horizontal portion having one of its ends resting on, and securely attached to, one of said end supports and the other end resting on, and securely attached to, the other end support; a pin securely fitted into and protruding forwardly from the front face of said horizontal portion of said frame structure; a lead screw attached to said frame structure by suitable means, having a key-groove cut in one of its end portions and running parallel with the axis thereof; a step gear mounted on the key-grooved end portion of said lead screw, said step gear having a key-groove cut into and running along the axial aperture therein and alining with said key-groove in said lead screw; a key in the key-grooves of said lead screw and said step gear; an adjustable apron hinged to, and depending from said lead screw and having one section of its upper portion cut away and the upper end of each of the remaining portions formed into an eye through which said lead screw passes and having also a forwardly protruding handle and a lateral portion extending integrally from said apron and running approximately parallel with said lead screw and having its lower portion comb-toothed, the opening formed by said cut-away portion receiving and embracing said step gear and holding it in place on said lead screw, said comb-toothed lower portion of said lateral extension engaging said pin protruding from the front face of said horizontal portion of said frame structure; and a stud gear meshing with said step gear.

In testimony whereof I have hereunto set my hand in presence of two subscribing witnesses.

ALBERT LANDEN McGILL.

Witnesses:
OSCAR J. SHAFER,
SARAH ROHERBERGER.

Copies of this patent may be obtained for five cents each, by addressing the "Commissioner of Patents, Washington, D. C."